(12) United States Patent
Kim et al.

(10) Patent No.: US 7,554,494 B2
(45) Date of Patent: Jun. 30, 2009

(54) BUILT-IN ANTENNA MODULE IN PORTABLE WIRELESS TERMINAL

(75) Inventors: Kang-Sik Kim, Suwon-si (KR); Il-Seob Baek, Yongin-si (KR); Seung-Hwan Jeong, Sungnam-si (KR)

(73) Assignee: Samsung Electronics Co., Ltd. (KR)

( * ) Notice: Subject to any disclaimer, the term of this patent is extended or adjusted under 35 U.S.C. 154(b) by 617 days.

(21) Appl. No.: 11/248,053

(22) Filed: Oct. 12, 2005

(65) Prior Publication Data

US 2006/0089184 A1 Apr. 27, 2006

(30) Foreign Application Priority Data

Oct. 21, 2004 (KR) ........................ 10-2004-0084260
Mar. 16, 2005 (KR) ........................ 10-2005-0021862

(51) Int. Cl.
*H01Q 1/24* (2006.01)
(52) U.S. Cl. .................................. 343/702; 379/433.02
(58) Field of Classification Search ................. 343/702, 343/700 MS, 904, 907; 379/433.01, 433.02
See application file for complete search history.

(56) References Cited

U.S. PATENT DOCUMENTS

| | | | |
|---|---|---|---|
| 2003/0032443 A1* | 2/2003 | Johnson et al. | 455/550 |
| 2004/0075612 A1* | 4/2004 | Spiropoulos | 343/702 |
| 2005/0017910 A1* | 1/2005 | Park | 343/702 |
| 2006/0049998 A1* | 3/2006 | Liao et al. | 343/702 |
| 2006/0256020 A1* | 11/2006 | Han et al. | 343/702 |

FOREIGN PATENT DOCUMENTS

KR 10-2005-0011561 1/2005

* cited by examiner

*Primary Examiner*—HoangAnh T Le
(74) *Attorney, Agent, or Firm*—The Farrell Law Firm, LLP

(57) ABSTRACT

Disclosed is a built-in antenna module for a portable wireless terminal, in which an antenna carrier allows a distance between a radiator and a mainboard. In the built-in antenna module, the antenna carrier includes a plate type junction panel to which the radiator is fixed, an outer barrier rib extending along an edge of the junction panel with a uniform height, and at least one compartment barrier rib for dividing a space formed by the junction panel and the outer barrier rib. The antenna carrier accommodates a speaker and a vibrator at the space formed by junction panel and the outer barrier rib, such that additional installation spaces for the speaker and the vibrator are not required and thereby the portable wireless terminal comes to be slim, lightweight, and simple.

16 Claims, 6 Drawing Sheets

BUILT-IN ANTENNA MODULE IN PORTABLE WIRELESS TERMINAL

PRIORITY

This application claims priority under 35 U.S.C. § 119 to an application entitled "Built-in Antenna Module In Portable Wireless Terminal" filed in the Korean Intellectual Property Office on Oct. 21, 2004 and assigned Serial No. 2004-84260 and "Built-in Antenna Module In Portable Wireless Terminal" filed in the Korean Intellectual Property Office on Mar. 16, 2005 and assigned Serial No. 2005-21862 the contents of which are herein incorporated by reference.

BACKGROUND OF THE INVENTION

1. Field of the Invention

The present invention relates to a built-in antenna module in a portable wireless terminal, and more particularly, to a built-in antenna module in a portable wireless terminal in which a speaker and/or a vibrator and a built-in antenna are arranged in the form of a module such that the terminal has a slim, lightweight, and simple feature.

2. Background of the Prior Art

In recent years, mobile wireless terminals, such as Personal Digital Assistant (PDA), Personal Communication Service (PCS) terminal, Digital Cellular System (DCS) terminal, Global Positioning System (GPS) terminal, cellular phones and wireless notebook computers, introduced various functions and designs. At the same time, small-sized, slim, and lightweight terminals are also needed to satisfy user's demand. Therefore, the designs of the terminals are focused on volume reduction while maintaining or improving the functions as well. Specifically, a rod antenna (or whip antenna) and a helical antenna, which are protruded outward from the terminal, are easy to break when dropped and are not portably convenient. Therefore, an installed antenna within the terminal is widely used in recent days (it is called a built-in antenna, internal antenna, or intenna).

Generally, a built-in antenna is electrically connected with an RF mainboard of a terminal main body and among the built-in antennas a Planar Inverted F Antenna (PIFA) is widely used owing to its reduced space requirement and good performance-to-cost ratio. The PIFA type antenna has two contact points, one electrically connected to an RF connector of a terminal mainboard and the other electrically connected to a conductive layer of the mainboard for grounding. Further, a radiator of the PIFA type antenna should be spaced a predetermined distance apart from a ground surface in order to improve the radiation characteristic and reduce the Specific Absorption Rate (SAR). Therefore, the radiator of the PIFA type antenna is mounted on an antenna carrier having a predetermined height and then the antenna carrier is installed on the ground (i.e. the terminal mainboard), such that the PIFA type antenna can be positioned off the mainboard. The antenna carrier is made of a non-conductive synthetic resin and has a rectangular block shape. The antenna carrier has been used to define the distance between the radiator and the mainboard.

The built-in antenna module is typically mounted on an upper portion of the terminal mainboard. This mounting position is above a keypad assembly, and in case of a folder type terminal the user grasps the terminal at that mounting position, thereby causing a weak electric field around the antenna. For this reason, some built-in antennas may be installed in a folder of the terminal. However, the built-in antenna is inevitably installed in the same area in which basic elements such as a speaker and a vibrator are also installed, thereby causing a spatial restriction to the terminal.

SUMMARY OF THE INVENTION

The present invention provides a built-in antenna module for a portable wireless terminal which can be installed in the portable wireless terminal without interference with a speaker and/or a vibrator, thereby allowing the portable wireless terminal to be slim, lightweight, and simple.

Further, the present invention provides a built-in antenna module for a portable wireless terminal in which a speaker or a vibrator is installed together with an antenna radiator as one module without affecting the radiation properties of the antenna module.

Further, the present invention provides a built-in antenna module for a portable wireless terminal in which a combination module of a speaker and a vibrator is installed together with an antenna radiator as one module, and a brushless vibration motor is employed in the vibrator to prevent an adverse influence on the radiation properties of the antenna module.

According to an aspect of the present invention, a built-in antenna module for a portable wireless terminal includes an antenna carrier to allow a distance between a radiator and a mainboard, the antenna carrier having: a plate type junction panel to which the radiator is fixed; an outer barrier rib extending along an edge of the junction panel with a uniform height; and at least one compartment barrier rib for dividing a space formed by the junction panel and the outer barrier rib.

The antenna carrier may accommodate a speaker and/or a vibrator according to an installation location of the built-in antenna module in the portable wireless terminal. For example, both the speaker and the vibrator can be accommodated in the antenna carrier in bar type terminals or slide type terminals. The speaker or vibrator can be accommodated in the antenna carrier in some folder type terminals because one of the speaker and vibrator is installed around the built-in antenna module.

The built-in antenna module is designed such that other elements around the built-in antenna module can be installed in combination with the built-in antenna module without interference between them, thereby reducing element installation space in the terminal.

According to another aspect of the present invention, a built-in antenna module for a portable wireless terminal includes: a mainboard; an antenna carrier assembly mounted on the mainboard and having a predetermined height; an antenna radiator installed on the antenna carrier assembly and electrically connected with an RF (Radio frequency) connector; and a combination speaker/vibrator module installed inside of the antenna carrier assembly.

The size of the portable wireless terminal can be reduced by installing the combination speaker/vibrator module. A vibration motor employed to the combination speaker/vibrator module may be a brushless motor to prevent noise by a brush connecting an armature and a rotor.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for conciseness. Though a folder type portable wireless terminal is illustrated to describe the present invention, the present invention is not limited to the illustrated terminal. The present invention can be applied to various kinds of terminals having a built-in antenna module, for example, bar type, flip type, and slide-up terminals.

Figure 1:
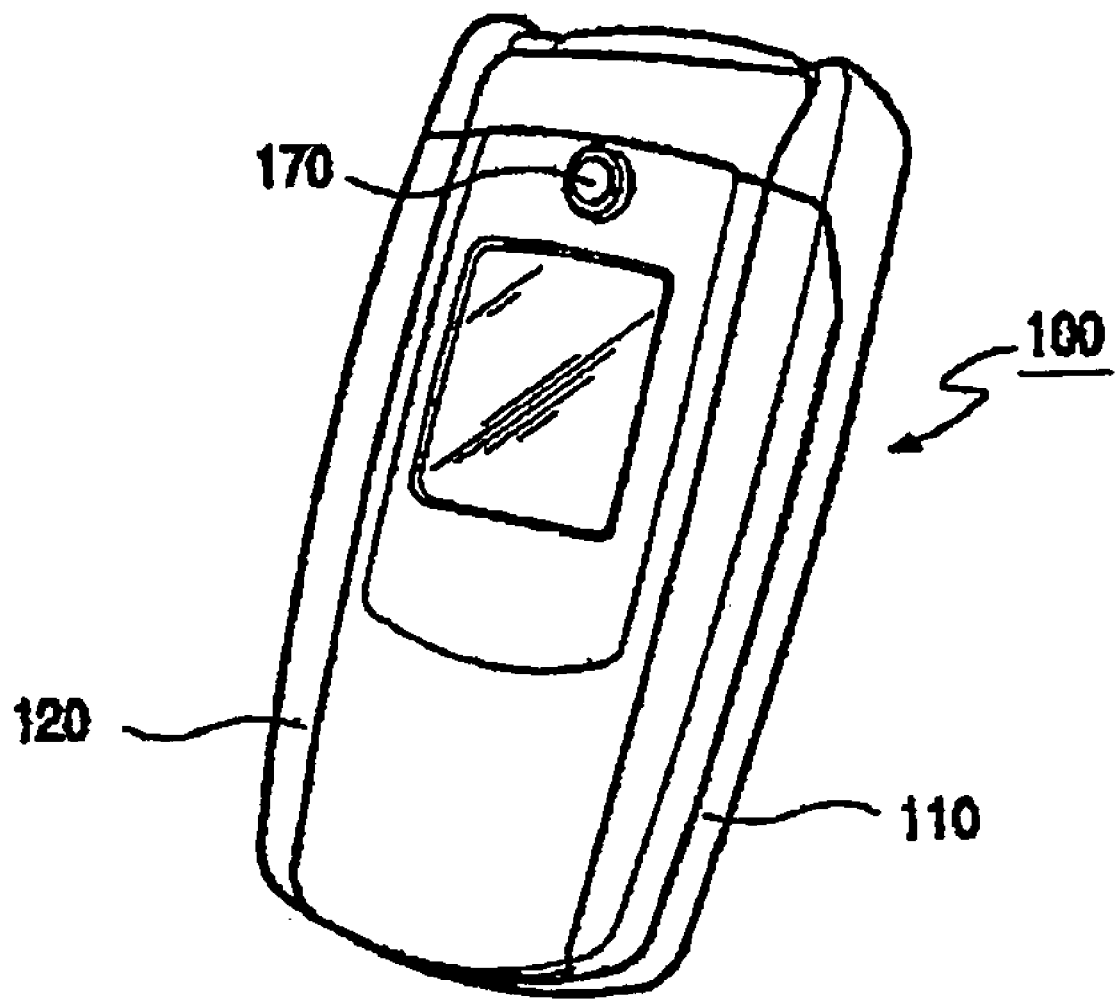
FIG. 1 is a perspective view of a portable wireless terminal having a built-in antenna module.
Figure 2:
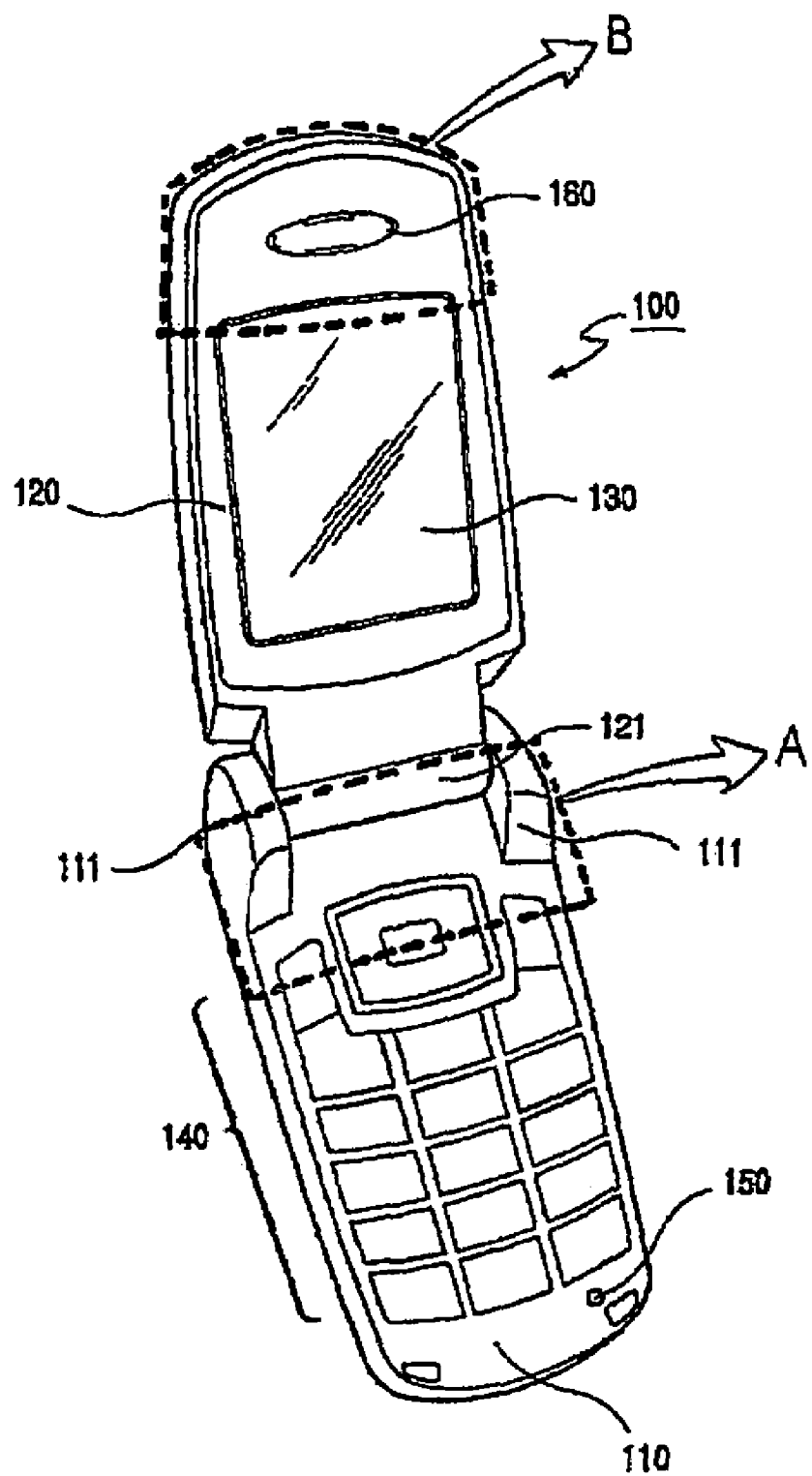
FIG. 2 is a perspective view of a portable wireless terminal, showing a location where a built-in antenna module of the present invention is installed.

FIG. 1 is a perspective view of a portable wireless terminal having a built-in antenna module, and FIG. 2 is a perspective view of a portable wireless terminal, showing a location where a built-in antenna module of the present invention is installed.

Referring to FIGS. 1 and 2, a terminal 100 having a built-in antenna module includes a main body 110, a folder 120 rotatably coupled to the main body 110, and a hinge module (not shown) enabling the rotation of the folder 120 at a predetermined angle range (generally between 130°-140°). The hinge module includes a hinge shaft in a hinge housing, a hinge cam engaged with the hinge shaft, and a hinge spring biasing the hinge cam against the hinge shaft. Generally, the hinge module is accommodated in the hinge housing as an assembly and installed in a boundary portion of the folder 120 or the main body 110. In this embodiment, the hinge module is installed in a center hinge arm of the folder 120 (sub-body), and a shaft head protruded from an end of the hinge module is coupled to one of hinge arms formed at both sides of the main body 110, for the opening and closing operations of the terminal.

The main body 110 includes a keypad assembly 140 having navigation buttons as a data input device and a microphone 150 under the keypad assembly 140 to receive a user's voice. The folder 120 includes a display 130 as a data output device and a speaker 160 from which the user can hear voice. Also, the terminal 100 may include an external display at an outer surface of the folder and a camera 170 above the external display for taking pictures. Since the terminal 100 uses a built-in antenna module installed therein, a protruded antenna is not present. The built-in antenna module may be installed at a dashed-line location (A) or (B)(refer to FIG. 2). A vibration speaker module may be additionally installed at the location (A) as well as the speaker 160, and a vibrator may also be installed at the location (A).

Hereinafter, the built-in antenna module installed at the location (A) in combination with the speaker and the vibrator will be described. However, the present invention is not limited to the installing location (A) or the combination. The built-in antenna module may be installed at the location (B) and it may be combined with one of the speaker and the vibrator.

Figure 3:
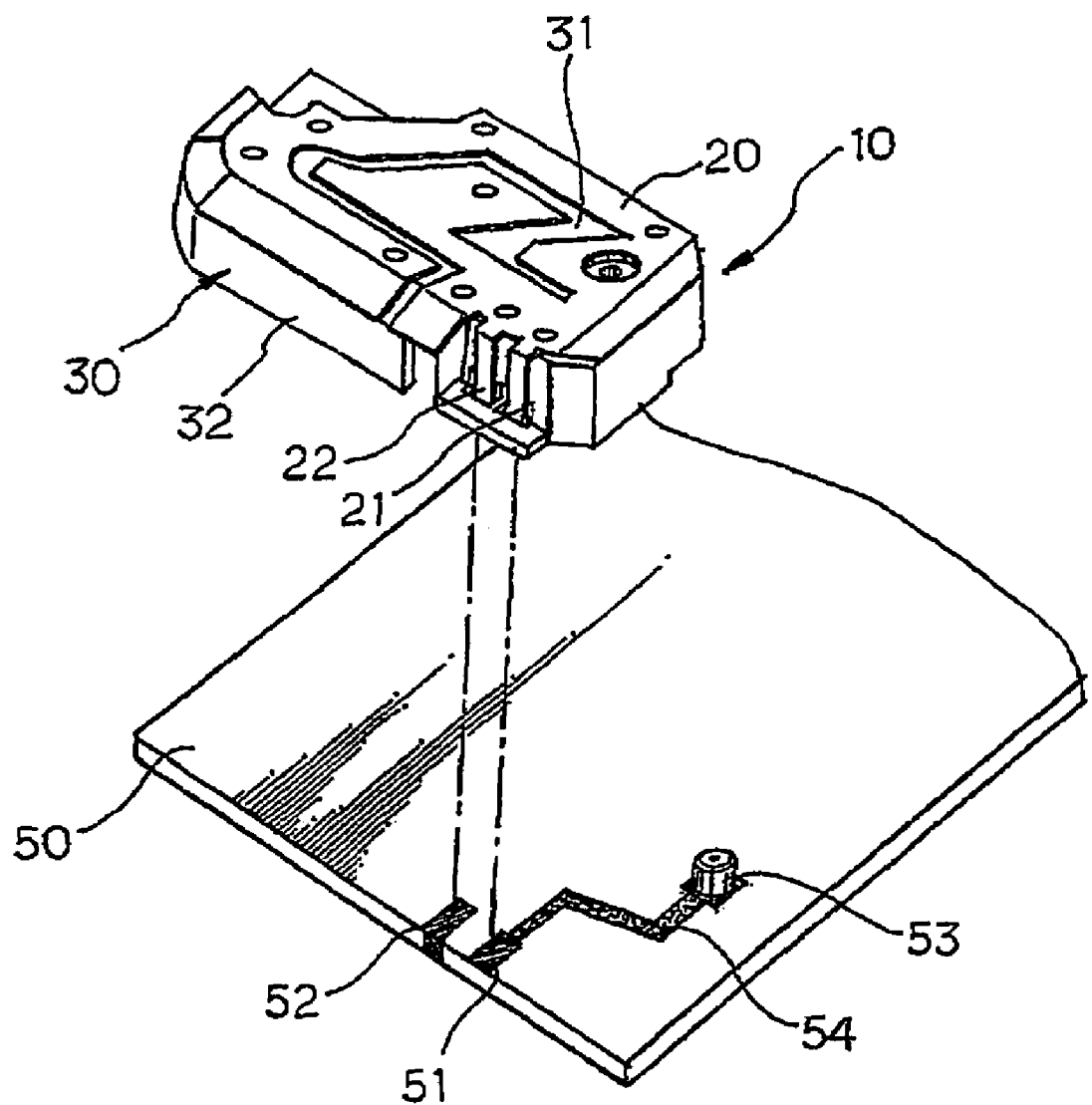
FIG. 3 is a view showing an arrangement of a built-in antenna module of the present invention on a mainboard in a portable wireless terminal.

FIG. 3 is a view showing an arrangement of a built-in antenna module of the present invention on a mainboard in a portable wireless terminal.

Referring to FIG. 3, a built-in antenna module 10 includes an antenna carrier 30 having a predetermined height and a radiator 20 installed on an outer surface of the antenna carrier 30. The built-in antenna module 10 is installed on a mainboard 50 by mounting the antenna carrier 30 on the mainboard 50. In case of a plate type inverted F antenna, the main function of the antenna carrier 30 is to space the radiator 20 a predetermined distance apart from the mainboard 50, for a maximum radiation performance of the radiator. The antenna carrier 30 and other components (to be later described) used to establish a space between the radiator 20 and the mainboard 50 are also collectively known as the antenna carrier assembly.

The radiator 20 includes a feed pin 21 and a feed pin 22 that are extended downwardly. The feed pin 21 is to be electrically connected to a feed point 51 of the mainboard 50, the feed point 51 being electrically connected to an RF connector 53 through a conductive pattern 54. The ground pin 22 is to come into contact with a ground point 52, for an electrical connection with a conductive layer of the mainboard 50.

Figure 4:
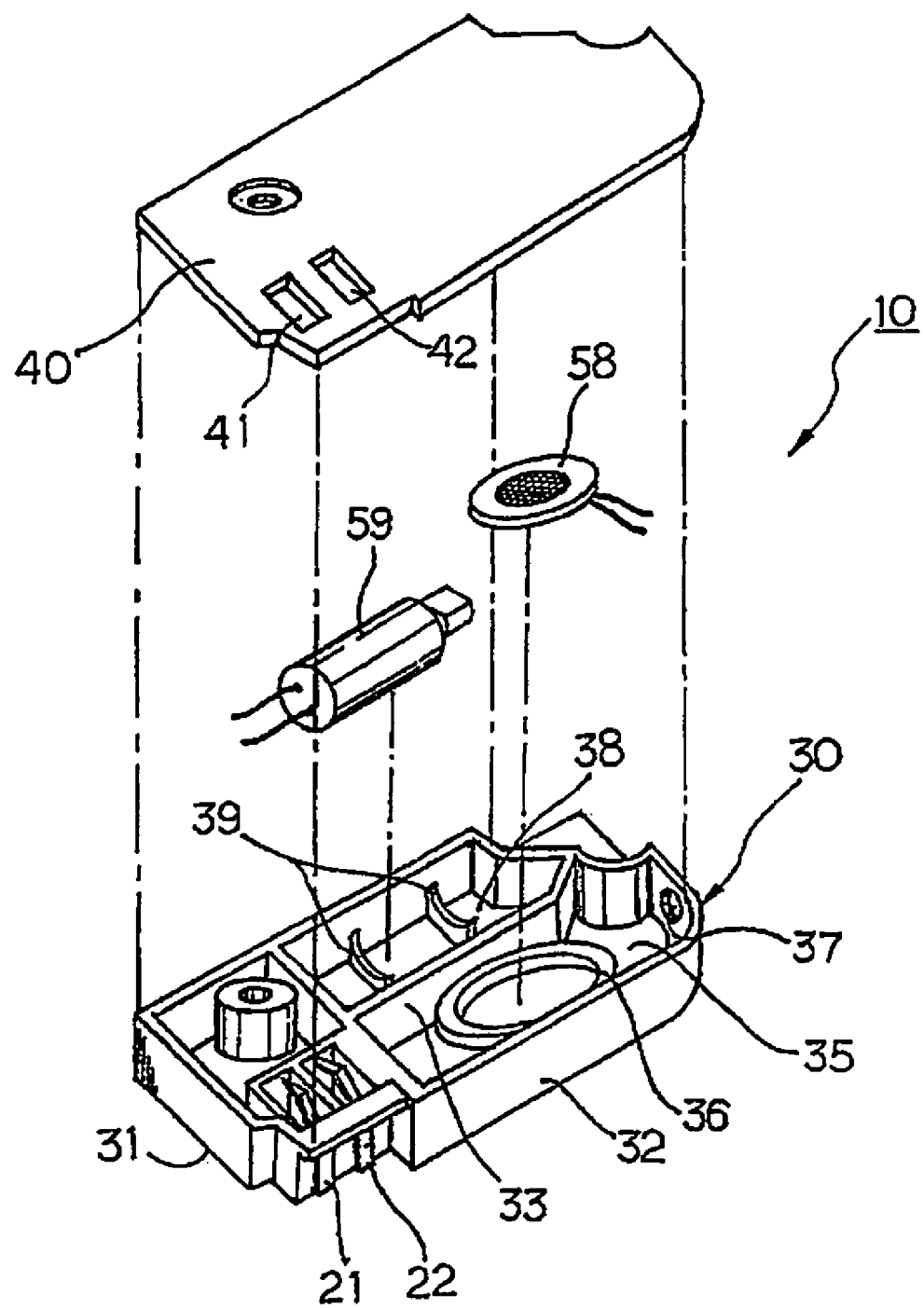
FIG. 4 is an exploded perspective view showing a structure of a built-in antenna module according to the present invention.

FIG. 4 is an exploded perspective view showing a structure of a built-in antenna module according to the present invention.

Referring to FIG. 4, the inside of the antenna carrier 30 is shown. The antenna carrier 30 includes a plate type junction panel 31 and an outer barrier rib 32. The radiator 20 is mounted on an outer surface of the junction panel 31 and the outer barrier rib 32 is upwardly extended with a uniform height along the edge of the junction panel 31. Therefore, the height of the outer barrier rib 32 determines the distance between the radiator 20 and the mainboard 50. At least one compartment barrier rib 33 is formed on the junction panel 31 to divide the inner space formed by the junction panel 31 and the outer barrier rib 32. The compartment barrier rib 33 may be flush with the outer barrier rib 32. In this embodiment, though one compartment barrier rib is formed to define a speaker-receiving space 35 and a vibrator-receiving space 38 for receiving a speaker 58 and a vibrator 59, more compartment barrier ribs can be formed. Also, a speaker-fixing ring 36 may be formed the speaker-receiving space 35 to readily fix the speaker 58 on the junction panel 31. Further, a wave hole 37 may be defined in the outer barrier rib 32 about the speaker-receiving space 35 to pass sound from the speaker 58. The shape and location of the wave hole 37 may be changed according to the shape of the antenna carrier 30 and the installed location of the speaker 58. In other words, the wave hole 37 can be defined in any shape provided the sound of the speaker 58 can be transmitted to the outside of the antenna carrier 30. In addition, at least one guide rib 39 may be formed in the vibrator-receiving space 38 for an easy installation of the vibrator 59.

A plate type cover 40 may be coupled on the antenna carrier 30 after the speaker 58 and vibrator 59 are received and fixed in the antenna carrier 30. Practically, one side of the cover 40 may be fixed to the end of the outer barrier rib 32 of the antenna carrier 30. Therefore, the other side of the cover 40 may come into contact with the mainboard 50. To fix the cover 40, screws, adhesive, ultrasonic welding, hot melt adhesion, or the like may be used as is well known in the related art.

Through holes 41 and 42 are defined in the cover 40 for passing the feed pin 21 and ground pin 22 that are extended from the radiator 20. Therefore, the feed pin 21 and ground pin 22 protrude from the cover 40 when the cover 40 is fixed to the antenna carrier 30, such that when the antenna carrier 30 is fixed to the mainboard 50, the feed pin 21 and ground pin 22 can be electrically connected with the feed point 51 and ground point 52 of the mainboard 50 in an easy way.

Figure 5:
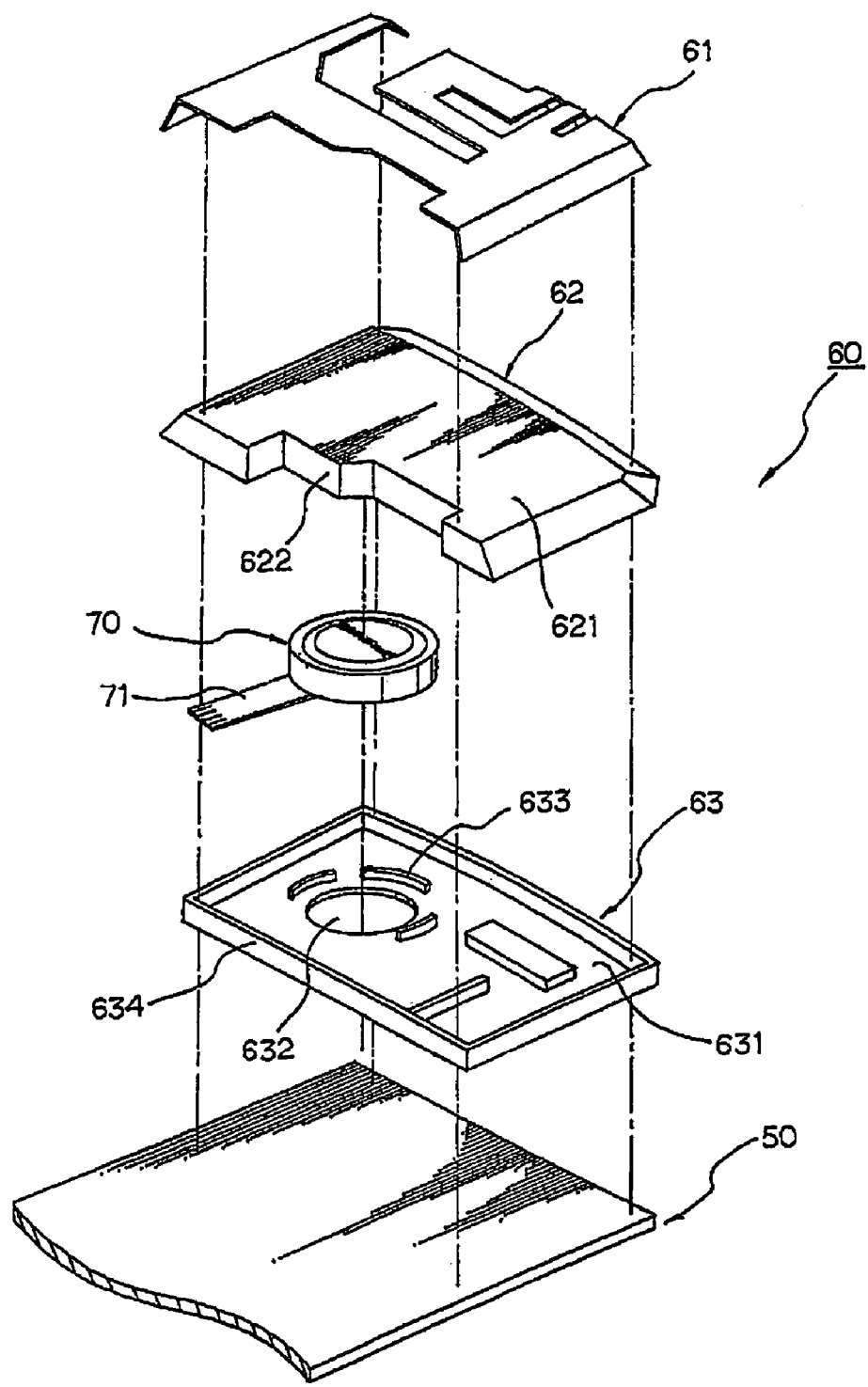
FIG. 5 is an exploded perspective view showing a structure of a built-in antenna module according to another embodiment of the present invention.
Figure 6:
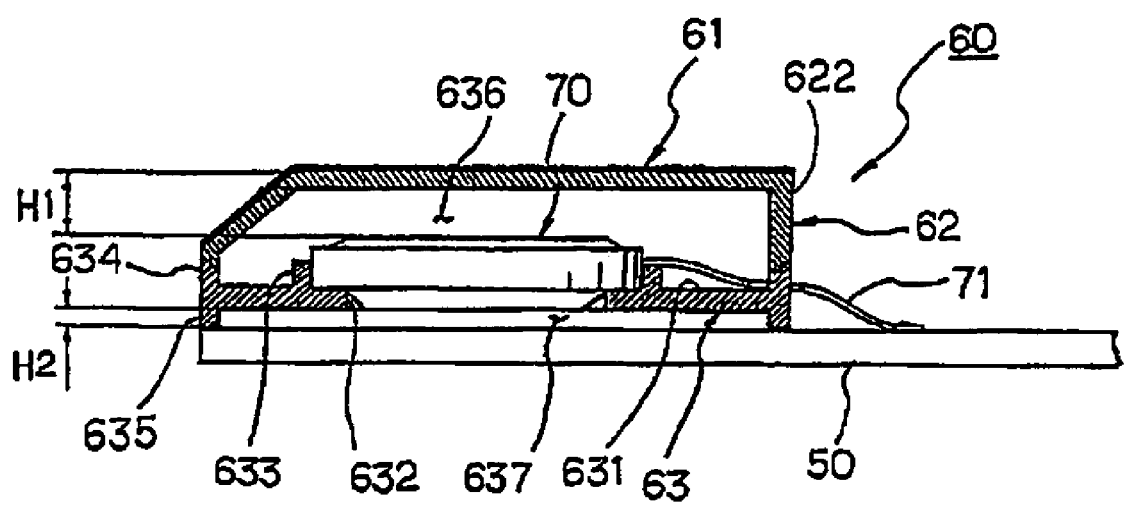
FIG. 6 is a sectional view showing the built-in antenna module depicted in FIG. 5 when mounted on a mainboard.

FIG. 5 is an exploded perspective view showing a structure of a built-in antenna module according to another embodiment of the present invention, and FIG. 6 is a sectional view showing the built-in antenna module depicted in FIG. 5 when mounted on a mainboard.

Referring to FIGS. 5 and 6, a built-in antenna module 60 includes an antenna carrier 62 mounted on the mainboard 50, an antenna radiator 61 installed on the antenna carrier 62, a cover 63 interposed between the antenna carrier 62 and the mainboard 50 to define an accommodation space 636 together with the antenna carrier 62, and a combination speaker/vibrator module 70 installed in the accommodation space 636.

The installation of the antenna radiator 61 on the antenna carrier 62 and the electrical connection of feed and ground pins to the mainboard 50 are the same as those described above with reference to FIGS. 1 to 4. Therefore, descriptions thereof will be omitted.

The antenna carrier 62 includes a plate type junction panel 621 on which the antenna radiator 61 is installed and an outer barrier rib 622 extended downwardly with a uniform height along the edge of the junction panel 621. Therefore, the antenna carrier 62 can define a downwardly opened space enclosed by the outer barrier rib 622.

The cover 63 is coupled to the antenna carrier 62 from the downwardly opened space, using a well-known method such as an ultrasonic welding, a hot melt adhesion, and a screwing. The cover 63 includes a base 631 and the base 631 defines an installation hole 632 with a predetermined diameter to partially expose the combination speaker/vibrator 70 installed in the accommodation space 636. Also, the cover 63 includes an upwardly protruded portion 633 around the installation hole 632 to tightly receive the combination speaker/vibrator module 70. The junction panel 621 may include a downwardly protruded portion (not shown) to hold the combination speaker/vibrator module 70 in association with the upwardly protruded portion 633.

Further, the cover 63 includes an upwardly extended first barrier rib 634 with a predetermined height along its edge and a downwardly extended second barrier rib 635 (leg barrier rib) with a predetermined height along its edge. The first barrier rib 634 is coupled to the outer barrier rib 622 of the antenna carrier 62 to define the accommodation space 636 in which the combination speaker/vibrator module 70 is accommodated. The leg barrier rib 635 prevents the exposed portion of the combination speaker/vibrator module 70 from contact with the mainboard 50. That is, when the built-in antenna module 60 is mounted on the mainboard 50, a separation space 637 with a height (H2) is defined between the bottom of the cover 63 and the mainboard 50 by the leg barrier rib 635 to provide a resonating space for the combination speaker/vibration 70.

In the accommodation space 636, the combination speaker/vibrator module 70 may also be spaced a distance (H1) apart from the top of the antenna carrier 62. According to an experimental result, the distance (H1) may be at least 2.3 mm.

A flexible printed circuit 71 connected to the combination speaker/vibrator module 70 may be electrically connected to the mainboard 50 via a through hole (not shown) defined in the antenna carrier 62.

Table 1 shows radiation properties of a conventional antenna module in a non-vibration mode, and Table 2 shows radiation properties of the conventional antenna module in a vibration mode.

TABLE 1

|  |  | GSM |  |  | DCS |  |
| --- | --- | --- | --- | --- | --- | --- |
|  | CH | BER | Power | CH | BER | Power |
| Max | 1 | 107 | 27.2 | 512 | 106 | 28.6 |
|  | 62 | 104 | 27.8 | 698 | 104 | 26.6 |
|  | 124 | 104 | 30.3 | 885 | 101 | 26.4 |
| Avg. | 1 | 106.5 | 26.4 | 512 | 98.1 | 23 |
|  | 62 | 103.5 | 27.2 | 698 | 97 | 21.6 |
|  | 124 | 103.5 | 29.5 | 885 | 93.6 | 21.3 |

TABLE 2

|  |  | GSM |  |  | DCS |  |
| --- | --- | --- | --- | --- | --- | --- |
|  | CH | BER | Power | CH | BER | Power |
| Max | 1 | 95 | 27.8 | 512 | 103 | 26.7 |
|  | 62 | 93 | 28.9 | 698 | 99 | 27.9 |
|  | 124 | 91 | 30.4 | 885 | 98 | 27.1 |
| Avg. | 1 | 92.1 | 26.9 | 512 | 94.9 | 21.6 |
|  | 62 | 90.4 | 28.1 | 698 | 91 | 21.1 |
|  | 124 | 88 | 29.2 | 885 | 87.9 | 20.6 |

When Tables 1 and 2 are compared, radiation sensitivity BER significantly varies about 10-15 dB Global System for Mobile Communication (GSM) band, and it also varies about 3-5 dB in DCS band.

Table 3 shows radiation properties of the antenna module of the present invention in a non-vibration mode, and Table 4 shows radiation properties of the antenna module of the present invention in a vibration mode. In the antenna module used to obtain the result in Tables 3 and 4, a combination speaker/vibrator module utilizing a brushless vibration motor is installed together with the antenna radiator as one module in the antenna module.

TABLE 3

|  |  | GSM |  |  | DCS |  |  | PCS |  |
| --- | --- | --- | --- | --- | --- | --- | --- | --- | --- |
|  | CH | BER | Power | CH | BER | Power | CH | BER | Power |
| Max | 1 | 107.5 | 28.2 | 512 | 107 | 24.2 | 512 | 106 | 26.3 |
|  | 62 | 106 | 30.1 | 698 | 105 | 26.8 | 661 | 106 | 24.6 |
|  | 124 | 105 | 30.7 | 885 | 105.5 | 28.4 | 810 | 106.5 | 23.6 |
| Avg. | 1 | 106.1 | 27.34 | 512 | 103.8 | 21.7 | 512 | 101.5 | 22.4 |

TABLE 3-continued

|  | GSM | | | DCS | | | PCS | | |
| --- | --- | --- | --- | --- | --- | --- | --- | --- | --- |
|  | CH | BER | Power | CH | BER | Power | CH | BER | Power |
|  | 62 | 105.5 | 29.25 | 698 | 101 | 22.7 | 661 | 102.1 | 20.6 |
|  | 124 | 104.7 | 29.78 | 885 | 101.3 | 24.7 | 810 | 102.6 | 20.5 |

TABLE 4

|  | GSM | | | DCS | | | PCS | | |
| --- | --- | --- | --- | --- | --- | --- | --- | --- | --- |
|  | CH | BER | Power | CH | BER | Power | CH | BER | Power |
| Max | 1 | 107 | 28.1 | 512 | 107 | 25.2 | 512 | 106 | 25.3 |
|  | 62 | 106 | 29.9 | 698 | 104.5 | 26.8 | 661 | 106 | 24.4 |
|  | 124 | 105 | 30.4 | 885 | 105 | 27.5 | 810 | 106.5 | 24.2 |
| Avg. | 1 | 106 | 27.2 | 512 | 103 | 22.1 | 512 | 102 | 21.8 |
|  | 62 | 105.3 | 28.9 | 698 | 100.7 | 23.5 | 661 | 102 | 20.7 |
|  | 124 | 104.3 | 29.3 | 885 | 101.3 | 24.2 | 810 | 102.7 | 20.6 |

When Tables 3 and 4 are compared, radiation sensitivity BER varies about 0.5-1 dB in GSM band and very little in Digital Cellular System (DCS) and Personal Communication Service (PCS) bands. That is, when the combination speaker/vibrator module is combined with the antenna radiator as one module, the performance of the antenna module increases significantly.

As described above, the built-in antenna module of the present invention is installed in a terminal without interference with other elements of the terminal, such that installed space of the antenna can be reduced, thereby allowing the terminal to have a slim, lightweight, and simple feature.

The foregoing embodiments are merely exemplary and are not to be construed as limiting the present invention. The description of the present invention is intended to be illustrative, and not to limit the scope of the claims. Many alternatives, modifications, and variations will be apparent to those skilled in the art.

What is claimed is:

1. A built-in antenna module for a portable wireless terminal, comprising an antenna carrier to allow a distance between a radiator and a mainboard, the antenna carrier including:
    a plate type junction panel to which the radiator is fixed;
    an outer barrier rib extending along an edge of the junction panel; and
    at least one compartment barrier rib for dividing a space formed by the junction panel and the outer barrier rib,
    wherein the space accommodates at least one of a vibrator and a speaker, and is closed with a cover after the accommodation.

2. The built-in antenna module of claim 1, wherein the height of the outer barrier rib is selected such that the distance between the radiator and the mainboard is sufficiently large to improve the radiation characteristic of the antenna and reduce the Specific Absorbtion Rate and to accommodate a speaker and vibrator.

3. The built-in antenna module of claim 2, wherein the space divided by the compartment barrier rib accommodates the speaker and the vibrator separately.

4. The built-in antenna module of claim 3, wherein the outer rib defines a wave hole about the space where the speaker is accommodated in order to pass speaker sound therethrough.

5. A built-in antenna module for a portable wireless terminal, comprising:
    a mainboard;
    an antenna carrier assembly mounted on the mainboard;
    an antenna radiator installed on the antenna carrier assembly and electrically connected with an RF (Radio frequency) connector;
    at least one accommodation space formed inside the antenna carrier assembly, the at least one accommodation space accommodating a combination speaker/vibrator module; and
    a plate type cover for closing the at least one accommodation space after the accommodation of the combination sneaker/vibrator module.

6. The built-in antenna module of claim 5, wherein a vibration motor employed to the combination speaker/vibrator module is a brushless motor.

7. The built-in antenna module of claim 5, wherein the antenna carrier assembly includes:
    an antenna carrier having a plate type junction panel on which the antenna radiator is installed and an outer barrier rib downwardly extended along an edge of the junction panel with a uniform height to define a downwardly opened space,
    wherein the plate type cover having a bottom faced with the mainboard, the plate type cover being coupled to the downwardly opened space in overlapping relationship with the outer barrier rib to define the accommodation space in which the combination speaker/vibrator module is accommodated.

8. The built-in antenna module of claim 7, wherein a vibration motor employed to the combination speaker/vibrator module is a brushless motor.

9. The built-in antenna module of claim 5, wherein the plate type cover includes:
    an installation hole having a predetermined diameter to partially expose the combination speaker/vibrator module; and
    an upwardly protruded portion with a predetermined shape around the hole to tightly enclose some portion of the circumference of the combination speaker/vibrator module.

10. The built-in antenna module of claim 9, wherein a vibration motor employed to the combination speaker/vibrator module is a brushless motor.

11. The built-in antenna module of claim 5, wherein the plate type cover includes a leg barrier rib downwardly extended along an edge to prevent the bottom of the plate type cover from direct face-contact with the mainboard when the antenna carrier assembly is installed on the mainboard.

12. The built-in antenna module of claim 11, wherein a vibration motor employed to the combination speaker/vibrator module is a brushless motor.

13. The built-in antenna module of claim 11, wherein the combination speaker/vibrator module installed inside of the antenna carrier assembly is spaced a predetermined distance apart from the antenna radiator in a vertical direction.

14. The built-in antenna module of claim 13, wherein a vibration motor employed to the combination speaker/vibrator module is a brushless motor.

15. The built-in antenna module of claim 13, wherein the predetermined distance is at least 2.3 mm.

16. The built-in antenna module of claim 15, wherein a vibration motor employed to the combination speaker/vibrator module is a brushless motor.

\* \* \* \* \*